United States Patent
Cheong et al.

(10) Patent No.: US 6,686,062 B2
(45) Date of Patent: Feb. 3, 2004

(54) MAGNESIUM CALCIUM THIOALUMINATE PHOSPHOR

(75) Inventors: Dan Daeweon Cheong, Mississauga (CA); M. Abdul Nakua, Mississauga (CA); Xingwei Wu, Brampton (CA)

(73) Assignee: iFire Technology Inc., Fort Saskatchewan (CA)

( * ) Notice: Subject to any disclaimer, the term of this patent is extended or adjusted under 35 U.S.C. 154(b) by 74 days.

(21) Appl. No.: 09/880,410

(22) Filed: Jun. 13, 2001

(65) Prior Publication Data

US 2002/0192498 A1 Dec. 19, 2002

(51) Int. Cl.$^7$ .............. B32B 19/00; B32B 9/00; H01J 1/62; H01J 63/04
(52) U.S. Cl. .............. 428/690; 428/917; 313/503; 313/504; 252/301.4 S
(58) Field of Search .............. 428/690, 917; 313/504, 503; 252/301.4 S

(56) References Cited

U.S. PATENT DOCUMENTS

| 5,309,070 A | 5/1994 | Sun et al. ............ 313/503 |
| 5,432,015 A | 7/1995 | Wu et al. |
| 5,505,986 A * | 4/1996 | Velthaus et al. ............ 427/66 |
| 5,677,594 A * | 10/1997 | Sun et al. ............ 313/503 |
| 6,447,654 B1 * | 9/2002 | Kosyachkov ............ 204/192.15 |

FOREIGN PATENT DOCUMENTS

| EP | 1191081 | 3/2002 |
| JP | 07-122364 | * 5/1995 |
| JP | 2001297877 | 10/2001 |
| WO | WO 0223957 | 3/2002 |

\* cited by examiner

Primary Examiner—Cynthia H. Kelly
Assistant Examiner—Camie S Thompson
(74) Attorney, Agent, or Firm—Fay, Sharpe, Fagan, Minnich & McKee, LLP

(57) ABSTRACT

A thin film phosphor for an electroluminescent device, the phosphor being a compound of the formula $Mg_xCa_{1-x}Al_2S_4$:M, where the value of x is in the range $0<x<0.3$ and M is a rare earth activator. A method for the preparation of the phosphor on a substrate is also disclosed.

17 Claims, 17 Drawing Sheets

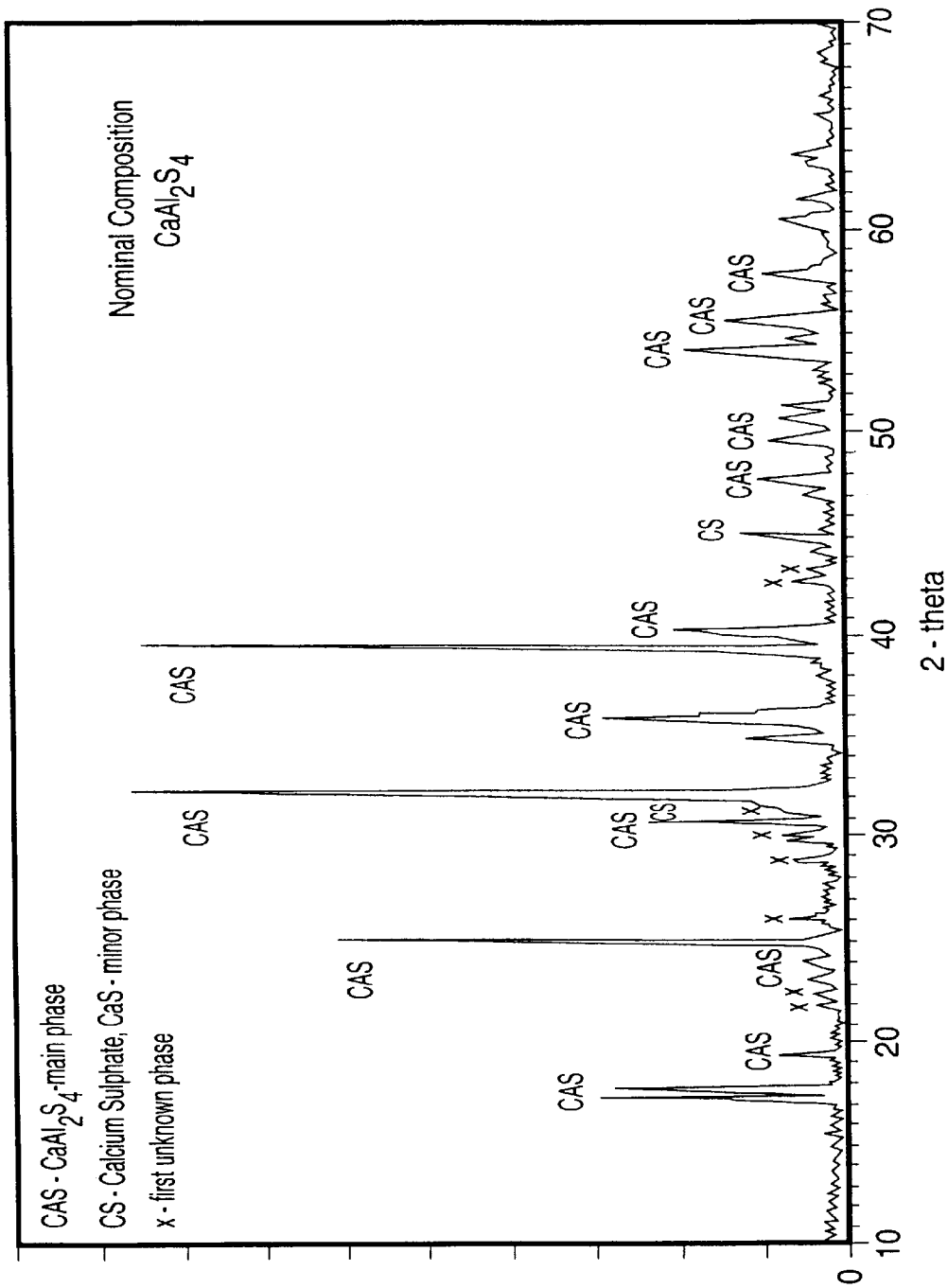

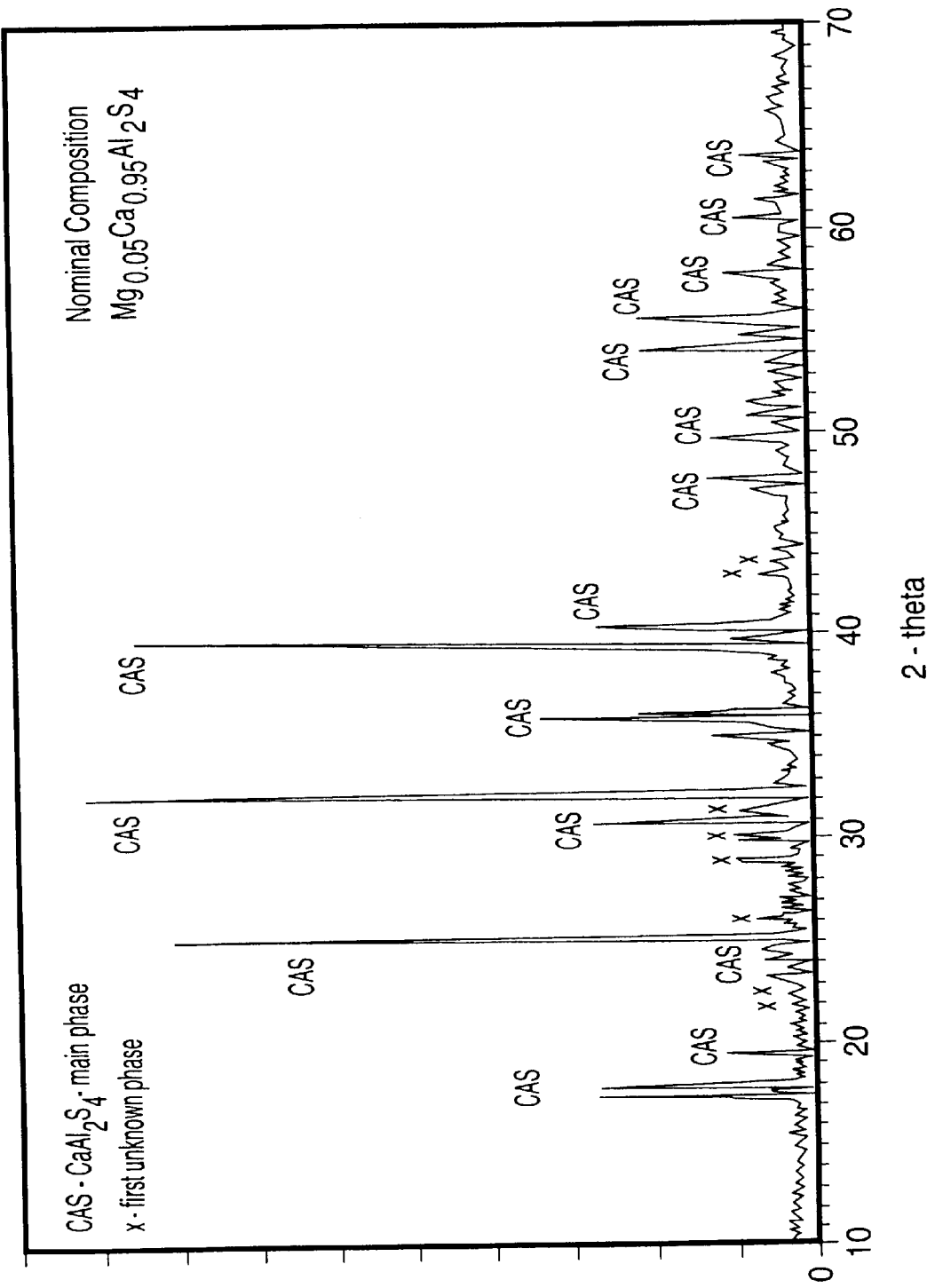

MAGNESIUM CALCIUM THIOALUMINATE PHOSPHOR

FIELD OF THE INVENTION

The present invention relates to single-phase magnesium calcium thioaluminate phosphors, particularly thin film magnesium calcium thioaluminate phosphors for electroluminescent displays and more particularly for electroluminescent displays employing thick film dielectric layers. The phosphor emits green light. The invention also relates to an electroluminescent apparatus employing such phosphors. The phosphors may be deposited at low temperatures and subsequently annealed to develop optimum phosphor performance. The deposition temperature is sufficiently low to prevent damage to photoresist materials that are required to be in place during the phosphor deposition process. The annealing step may be done following lithography steps required to define the phosphor pattern for the sub-pixels.

In particular, the present invention relates to a high luminance green phosphor material for full colour electroluminescent displays that is compatible with photolithographic processes used to pattern thin phosphor films comprising distinct materials for red, green and blue sub-pixels on the display. Preferably, such electroluminescent displays employing thick film dielectric layers with a high dielectric constant.

BACKGROUND TO THE INVENTION

Thick film dielectric structures provide for superior resistance to dielectric breakdown, a reduced operating voltage as well as the use of thicker phosphor films as compared to thin film electroluminescent (TFEL) displays, as exemplified by U.S. Pat. No. 5,432,015. The thick film dielectric structure when it is deposited on a ceramic or other refractory substrate will withstand somewhat higher processing temperatures than TFEL devices, which are typically fabricated on glass substrates. This increased temperature tolerance facilitates annealing of phosphor films at higher temperatures to improve their luminosity. With these advantages and with recent advances in blue-emitting phosphor materials, these displays have approached the luminosity and colour coordinates required to achieve the technical performance of traditional cathode ray tube (CRT) displays. Nevertheless, achievement of optimum energy efficiency requires that different phosphor materials be used for red, green and blue sub-pixels for the displays. Thus, methods of patterning deposited phosphor films to form the respective sub-pixels are required. Such patterning is typically achieved using photolithographic processes, which require the use of polymeric photoresist materials that will only withstand relatively low temperatures during processing.

Traditionally, green sub-pixels for electroluminescent displays have used a manganese-activated zinc sulphide phosphor, and the use of a suitable optical filter to achieve acceptable CIE colour coordinates. However, because the spectral emission from this phosphor material is relatively wide, ranging from red to green, there is a substantial loss of luminance as the light passes through the filter, resulting in a relatively low energy efficiency and correspondingly high power consumption for the display. Alternate green phosphors with a narrower emission spectrum tuned to provide acceptable green colour coordinates have been evaluated. One such phosphor is terbium-activated zinc sulphide that has a spectral emission centered on green, but this phosphor still requires use of a filter to provide acceptable colour coordinates. Another phosphor is europium-activated calcium thioaluminate, which has a green emission that can provide acceptable colour coordinates without the use of an optical filter. However, this phosphor is more difficult to deposit as a thin film for electroluminescent displays. A process for depositing such a phosphor film is described in U.S. patent application Ser. No. 09/747,315 but the process requires that deposition be carried out using a substrate temperature of at least about 200° C. followed by an annealing process at a temperature of 650° C. in order to achieve adequate luminosity. The required thioaluminate compound is not formed from the deposited materials during the deposition step, and the annealing step is required to form the thioaluminate. The maximum annealing temperature is determined by the thermal stability of the substrate upon which the phosphor has been deposited.

In general, both the deposition temperature and the annealing temperature are important variables in determining the process conditions for a phosphor film with optimum performance. If the deposition temperature must be lowered due to problems of stability of the deposition materials at higher temperatures, it may not be possible to compensate for the lower deposition temperature by use of a higher annealing temperature. The reasons for this are complex, but generally relate to the formation of intermediate compounds following deposition but prior to annealing. The substrate temperature during deposition may affect the nature and concentration of these intermediate compounds, which may in turn affect the quality of the final phosphor film following annealing.

In full colour electroluminescent displays with a thick film dielectric employing a patterned phosphor structure, the maximum temperature tolerated by photoresist materials used in the patterning process may limit the deposition temperature. The annealing step is typically done after completion of the patterning process when photoresist materials have been removed. The maximum temperature that can be tolerated by the thick film dielectric structure determines the maximum temperature acceptable in the annealing step.

The use of calcium thioaluminate phosphors is taught in U.S. patent application Ser. No. 09/747,315, with the phosphor being deposited using electron beam evaporation from two sources. A U.S. patent application entitled "Thioaluminate Phosphor Material with a Gadolinium Co-activator" and filed May 30, 2001 teaches the use of gadolinium as a co-activator to improve the luminosity and electro-optical properties of electroluminescent devices of phosphors that include calcium thioaluminate.

A green emitting phosphor that may be deposited at relatively low temperatures, especially at temperatures that are sufficiently low to reduce or prevent damage to photoresist materials used in preparation of electroluminescent devices, would be useful.

SUMMARY OF THE INVENTION

An aspect of the present invention provides a thin film phosphor for an electroluminescent device, said phosphor comprising a compound of the formula $Mg_xCa_{1-x}Al_2S_4$:M, where the value of x is in the range $0<x<0.3$ and M is a rare earth activator.

In a preferred embodiment of the thin film phosphor, the value of x is in the range $0.05<x<0.20$.

In another embodiment, said rare earth activator is europium or cerium, especially europium.

In a further embodiment, the atomic ratio of europium to aluminum is in the range of 0.005 to 0.05.

Another aspect of the present invention provides an electroluminescent device comprising the thin film phosphor on a substrate.

In a preferred embodiment, the phosphor has a thickness in the range of 0.2 to 1.0 micrometers, especially a thickness in the range of 0.3 to 0.6 micrometers.

In further embodiments, the thin film phosphor is adjacent to a thin film of zinc sulphide, especially sandwiched between thin films of zinc sulphide.

A further aspect of the present invention provides a thin film phosphor for an electroluminescent device, said phosphor comprising magnesium calcium thioaluminate activated with a rare earth metal, said magnesium calcium thioaluminate containing an amount of magnesium to effect a lowering of the temperature of deposition of the phosphor on a substrate.

In preferred embodiments of the method, the amount of magnesium is sufficient to lower the temperature of deposition to not more than 200° C., especially sufficient to lower the temperature of deposition to not more than 175° C.

Another aspect of the present invention provides a method for the preparation of a phosphor on a substrate, said phosphor comprising a compound of the formula $Mg_xCa_{1-x}Al_2S_4$:M, where the value of x is in the range 0<x<0.3 and M is a rare earth activator, said method comprising the steps of:
(i) depositing a mixtures of sulphides of magnesium, calcium, aluminum and said rare earth metal on a substrate, the ratios of said sulphides being selected to provide a mixture of sulphides of said formula on the substrate; and
(ii) annealing the mixture of sulphides on the substrate so as to form said phosphor.

In a preferred embodiment of the method, the mixture of sulphides is deposited on the substrate at a temperature of not greater than 200° C., especially not greater than 175° C., and preferably not greater than 150° C.

In another embodiment, prior to step (i), a photoresist pattern is deposited on said substrate, especially using photolithography.

Still another aspect of the invention provides a method for the preparation of a phosphor on a substrate, said method comprising the steps of:
(i) depositing a photoresist pattern on said substrate;
(ii) depositing a mixture of sulphides on said photoresist pattern at a temperature of not greater than 200° C., said mixture of sulphides forming magnesium calcium thioaluminate;
(iii) removing said photoresist; and
(iv) annealing said mixture of sulphides to form said phosphor.

In a preferred embodiment of the method, the phosphor comprises a compound of the formula $Mg_xCa_{1-x}Al_2S_4$:M, where the value of x is in the range 0<x<0.3 and M is a rare earth activator, said mixture of sulphides being selected to form said phosphor.

In further embodiments, the temperature in step (ii) is not greater than 175° C., especially not greater than 150° C.

BRIEF DESCRIPTION OF THE DRAWINGS

The present invention will be described with reference to the embodiments shown in the drawings, in which:

FIGS. 4a to 4h are representations of x-ray diffraction patterns for magnesium calcium thioaluminate powders having different magnesium concentrations;

DETAILED DESCRIPTION OF THE INVENTION

Aspects of the present invention relate to single-phase magnesium calcium thioaluminate phosphors, particularly thin film magnesium calcium thioaluminate phosphors for electroluminescent displays and more particularly for electroluminescent displays employing thick film dielectric layers. The phosphor emits green light.

The magnesium calcium thioaluminate phosphor may be represented by the chemical formula $Mg_xCa_{1-x}Al_2S_4$:M, where the value of x is in the range 0<x<0.3. Preferably the value of x is in the range of 0.05<x<0.20. M is a rare earth activator, for instance cerium or europium and preferably europium. In particular, the atomic ratio of europium to aluminum in the phosphor is in the range of 0.005 to 0.05.

The phosphor may be deposited as a thin film, especially with a thickness in the range 0.2 to 1.0 micrometers, preferably in the range of 0.3 to 0.6 micrometers.

The phosphor may be used in conjunction with thin film dielectric layers sandwiching the phosphor film, the thin film dielectric layers being chemically compatible with the phosphor. Examples of such layers include barium titanate, alumina, silicon oxynitride, barium tantalate, tantalum oxide and the like. As discussed below, the phosphor film may be adjacent to and in particular encapsulated by buffer layers of undoped ZnS.

Figure 1:
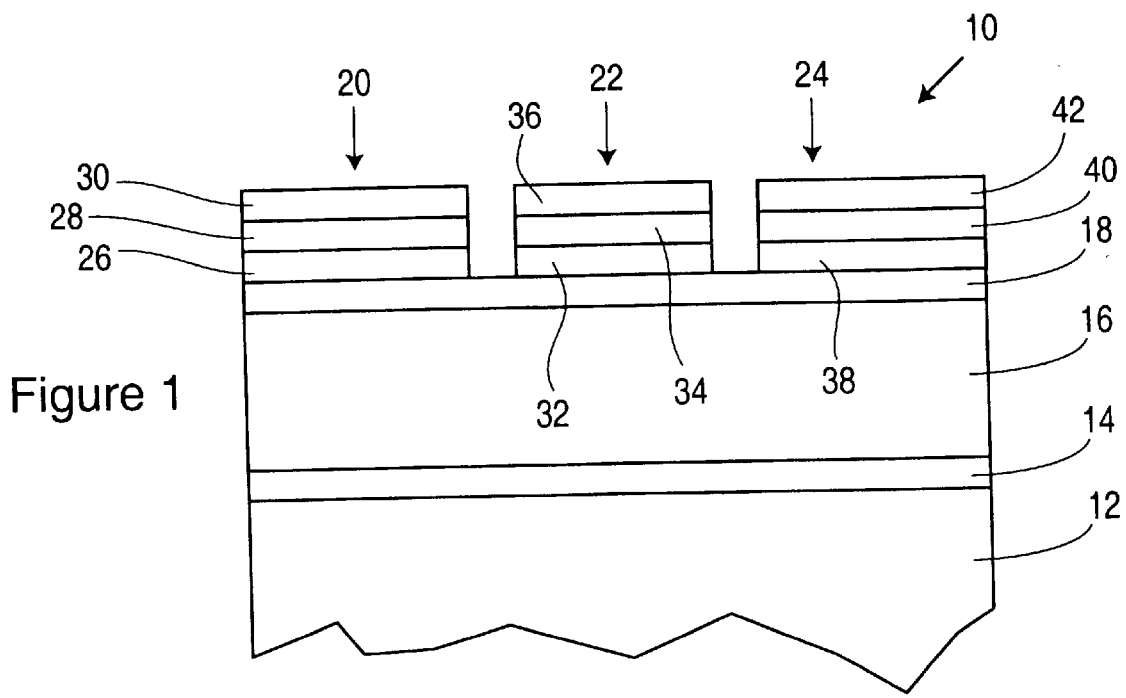
FIG. 1 is a schematic representation of a section of an electroluminescent element comprising a thick film dielectric layer and a phosphor composition typical of the present invention.
Figure 2:
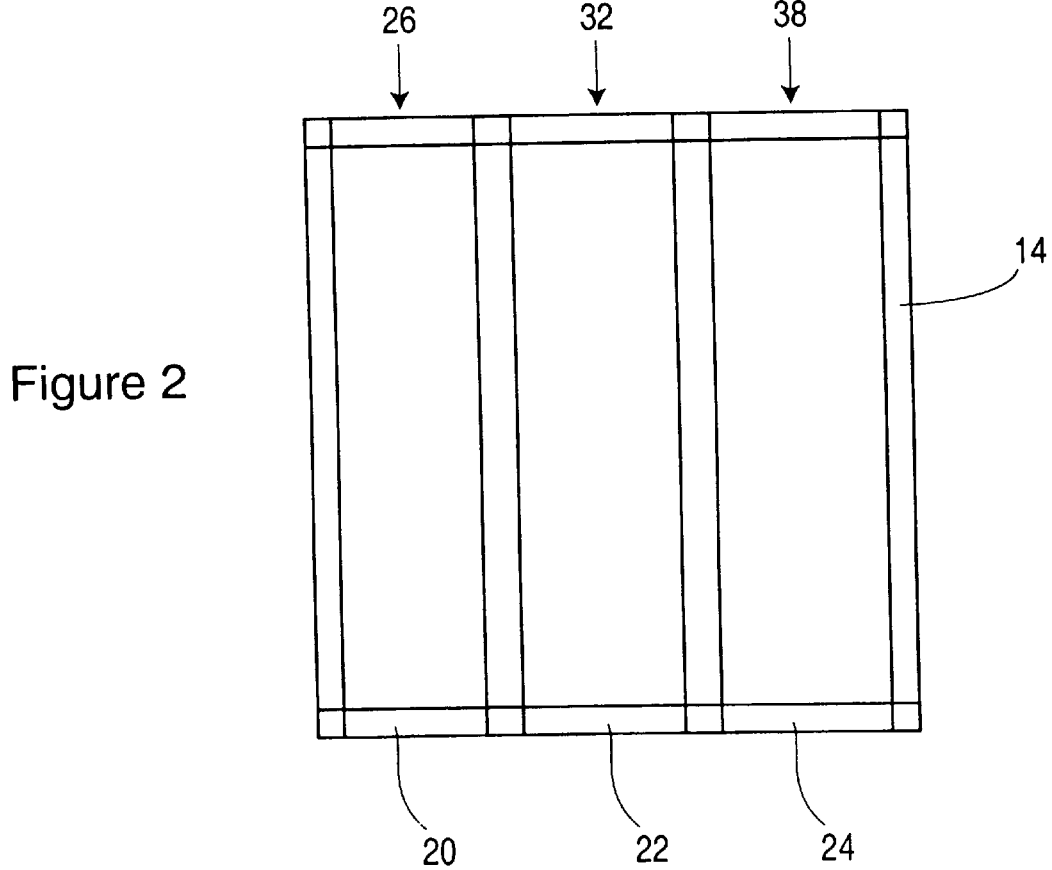
FIG. 2 is a schematic representation of a plan view of a full colour electroluminescent pixel and its constituent sub-pixels.

The present invention is further illustrated by the embodiment shown in FIGS. 1 and 2. FIG. 1 shows a cross-section of an electroluminescent device utilizing a phosphor of the present invention. FIG. 2 shows a plan view of the electroluminescent device. The electroluminescent device, generally indicated by 10, has a substrate 12 on which is located row electrode 14. Thick film dielectric 16 has thin film dielectric 18 thereon. Thin film dielectric 18 is shown with three pixel columns, referred to as 20, 22 and 24, located thereon. The pixel columns contain phosphors to provide the three basic colours viz. red, green and blue. Pixel column 20 has red phosphor 26 located in contact with thin film dielectric 18. Another thin film dielectric 28 is located on red phosphor 26, and column electrode 30 is located on thin film dielectric 28. Similarly, pixel column 22 has green phosphor 32 on thin film dielectric 18, with thin film dielectric 34 and column electrode 36 thereon. Pixel column 24 has blue phosphor 38 on thin film dielectric 18, with thin film dielectric 40 and column electrode 42 thereon.

A variety of substrates may be used, as will be understood by persons skilled in the art. The preferred substrate is a substrate that is opaque in the visible and infrared regions of the electromagnetic spectrum. In particular, the substrate is a thick film dielectric layer on a ceramic substrate. Examples of such substrates include alumina, and metal ceramic composites.

The magnesium calcium thioaluminate phosphor material may be deposited as a thin film at a temperature sufficiently low to make the phosphor compatible with photolithographic processes for patterning the phosphors used on a full colour electroluminescent display. It is believed that the presence of magnesium in the composition effects a lowering of the temperature of the substrate that is required for phosphor film deposition, compared with the temperatures required for other thioaluminates, including calcium thioaluminate. In embodiments of the present invention, deposition is carried out using electron beam deposition from two sources with the relative evaporation rate from the sources adjusted to achieve the desired film composition. In another embodiment, sputtering from a single source may be used with the target composition being adjusted with respect to the desired film composition to account for differences in the sticking coefficients for different atomic species impinging and condensing on the substrate during deposition, provided that the deposition temperature is sufficiently low to prevent damage to photoresist materials that are required to be in place during the phosphor deposition process. The phosphors deposited at low temperatures are subsequently annealed to develop optimum phosphor performance, resist materials normally being removed prior to annealing. The annealing step may be done following lithography steps required to define the phosphor pattern for the sub-pixels. A phosphor material with improved luminosity and energy efficiency may be obtained.

Further embodiments of the invention relate to an electroluminescent apparatus employing the magnesium calcium thioaluminate phosphors. In particular, embodiments of the present invention relate to a high luminance green phosphor material for full colour electroluminescent displays that is compatible with photolithographic processes used to pattern thin phosphor films comprising distinct materials for red, green and blue sub-pixels on the display. Preferably, such electroluminescent displays employing thick film dielectric layers with a high dielectric constant, as discussed herein.

The deposition of the composition may be carried out in an atmosphere of $H_2S$, sulphur or other volatile sulphur bearing compounds that will not contaminate the phosphor film as it is deposited if there is a tendency for the deposited compound to be deficient in sulphur. In particular, the deposition is done in a hydrogen sulphide atmosphere so that deposited species in the film can react with sulphide derived from the hydrogen sulphide to adequately saturate the deposited film with sulphide and achieve the desired film composition. However, in some instances, it may be possible to operate the method in a low pressure inert gas atmosphere without $H_2S$.

In further aspects of the present invention, the phosphor is located adjacent to a thin film of zinc sulphide. In particularly preferred embodiments of this aspect of the invention, the magnesium calcium thioaluminate thin film phosphor is encapsulated or sandwiched between thin films of zinc sulphide. The zinc sulphide layers are believed to increase the slope of the luminescence versus voltage curve for electroluminescent devices as compared to similar devices having the same phosphor at the same thickness but without the zinc sulphide layer.

The present invention is illustrated by the following examples.

EXAMPLE I

A series of europium-activated magnesium calcium thioaluminate powders were prepared by blending powders of calcium sulphide, magnesium sulphide, aluminum sulphide and europium sulphide. The powders were blended in ratios to prepare phosphor powders corresponding to the nominal formula $Mg_xCa_{1-x}Al_2S_4$:Eu, where x is 0.00, 0.01, 0.05, 0.10, 0.15, 0.20, 0.35, and 0.50. The blended powders were pressed to form cylindrical pellets having a diameter of 1.3 centimeters and a height of 0.75 centimeters. The pellets were sintered in an alumina boat under nitrogen using a belt furnace and a temperature profile with a peak temperature of about 1000° C. for about 10 minutes. However, the actual peak temperature obtained may have been lower than 1000° C. due to the thermal loading of the boat in the furnace.

The sintered phosphors were excited using a mercury lamp generating ultraviolet light having a peak wavelength of 365 nanometers. The photoluminescence of the phosphors was measured using a Minolta model CS-100-A photometer.

Figure 3:
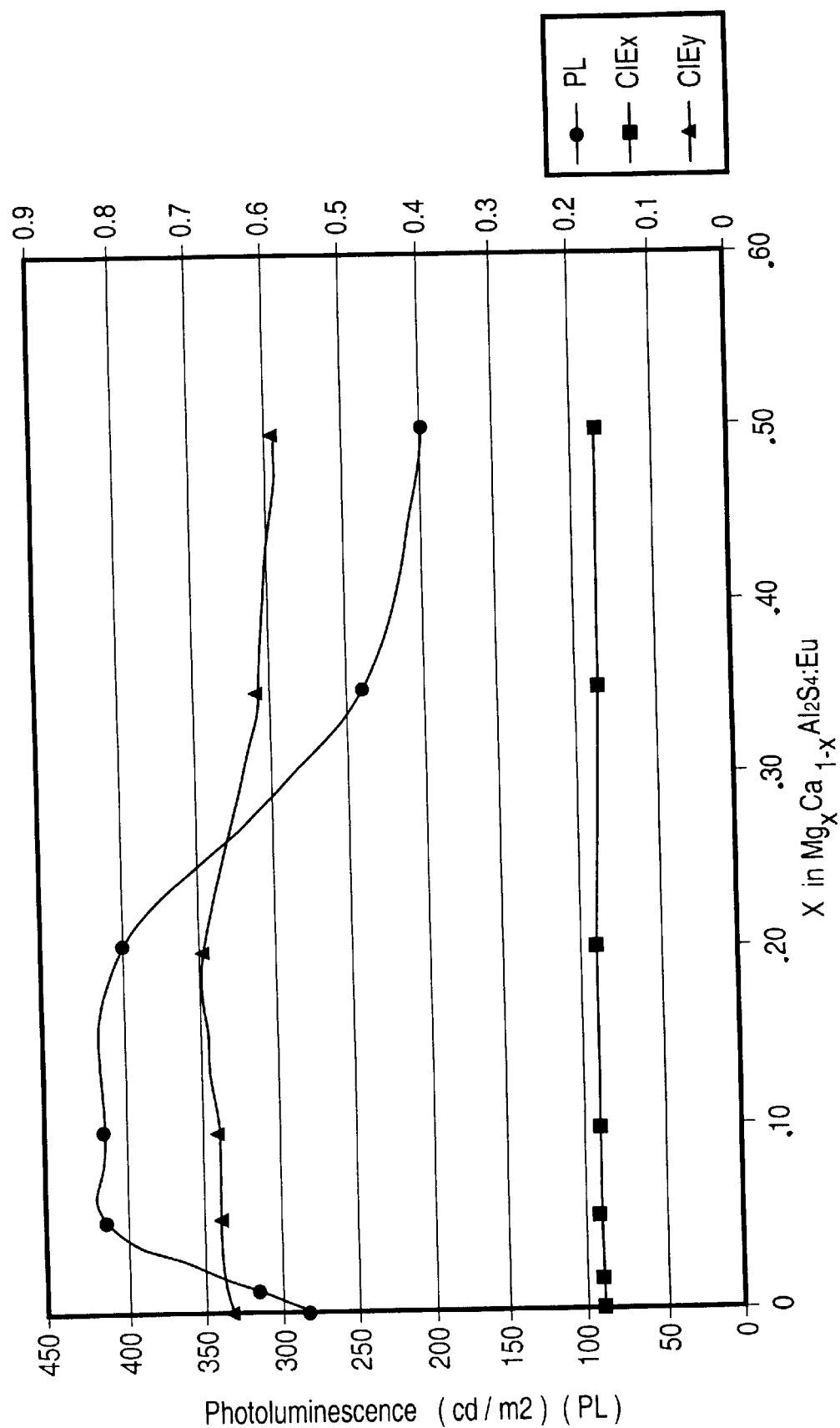
FIG. 3 is a graphical representation of photoluminescence and CIE colour coordinates for europium activated magnesium calcium thioaluminate powders for different magnesium concentrations.
Figure 4B:
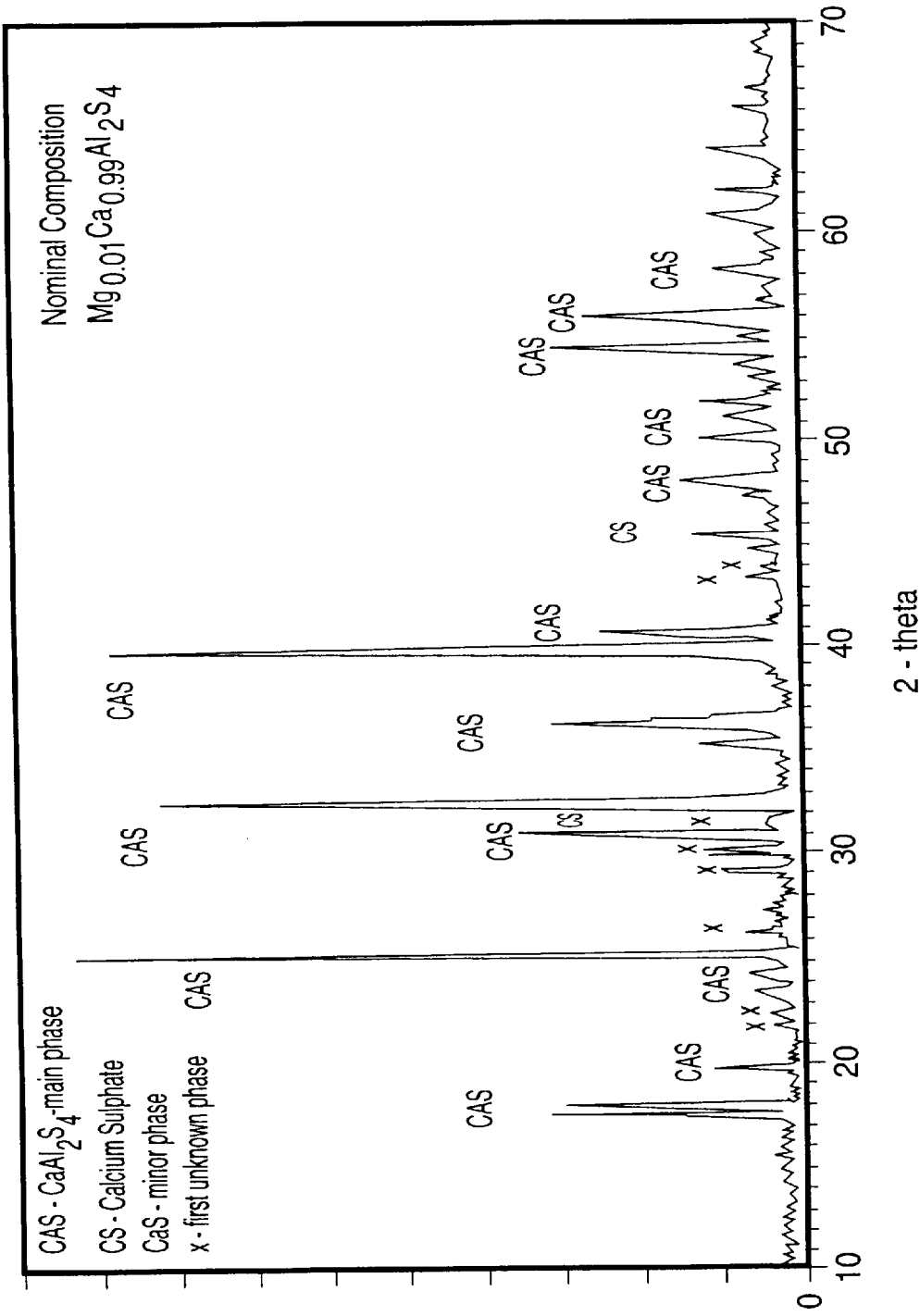
Figure 4D:
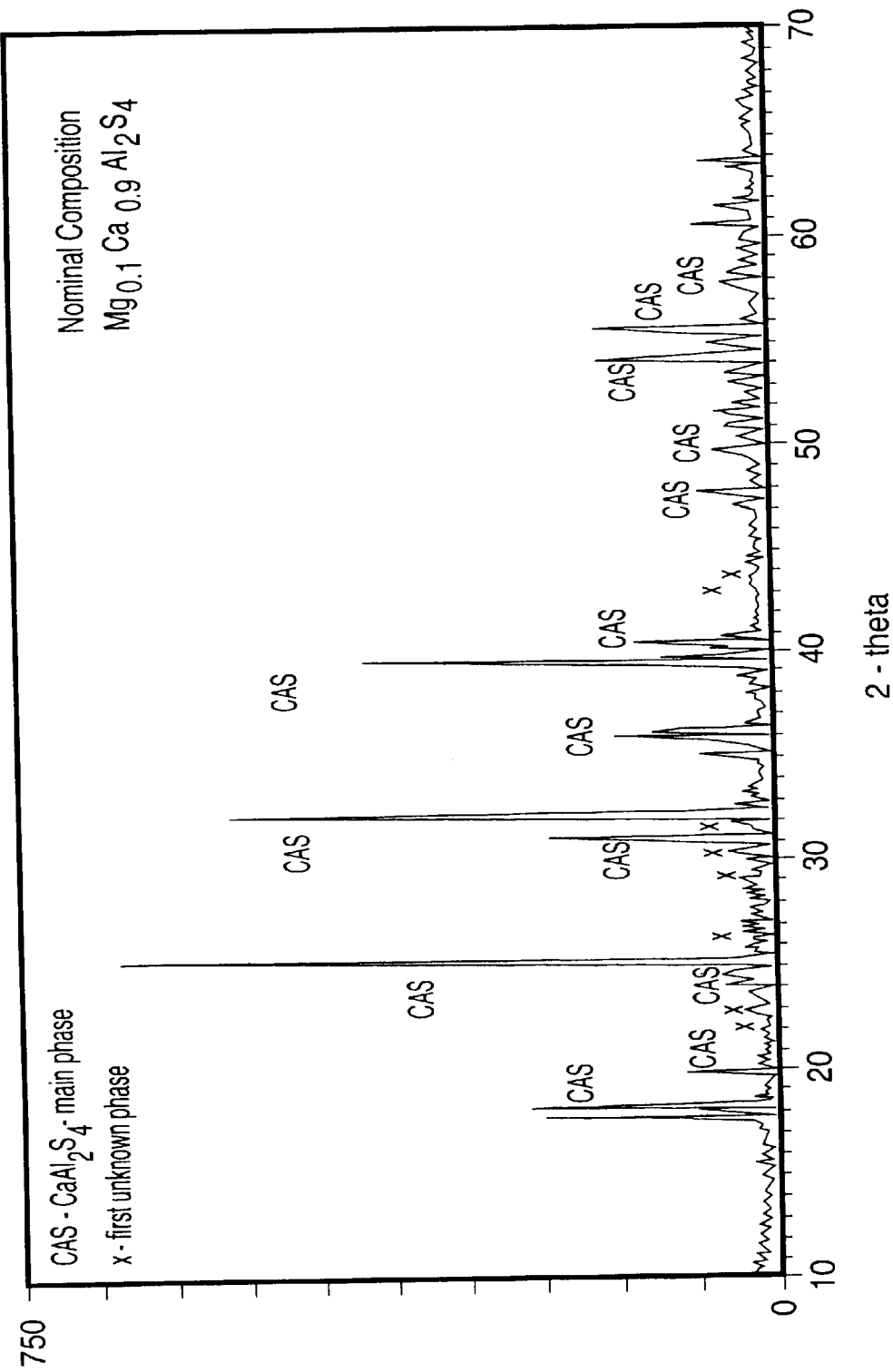
Figure 4E:
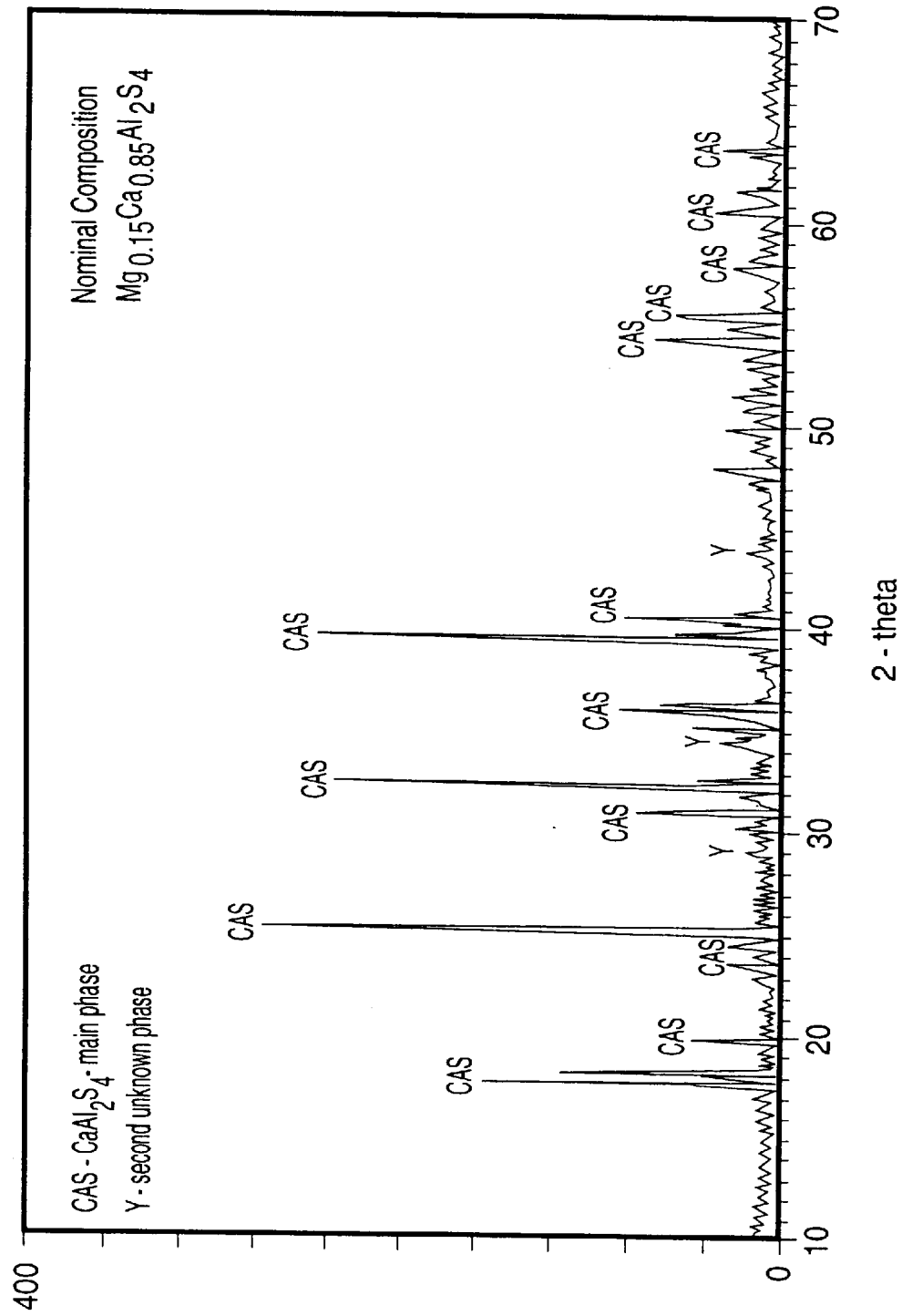
Figure 4F:
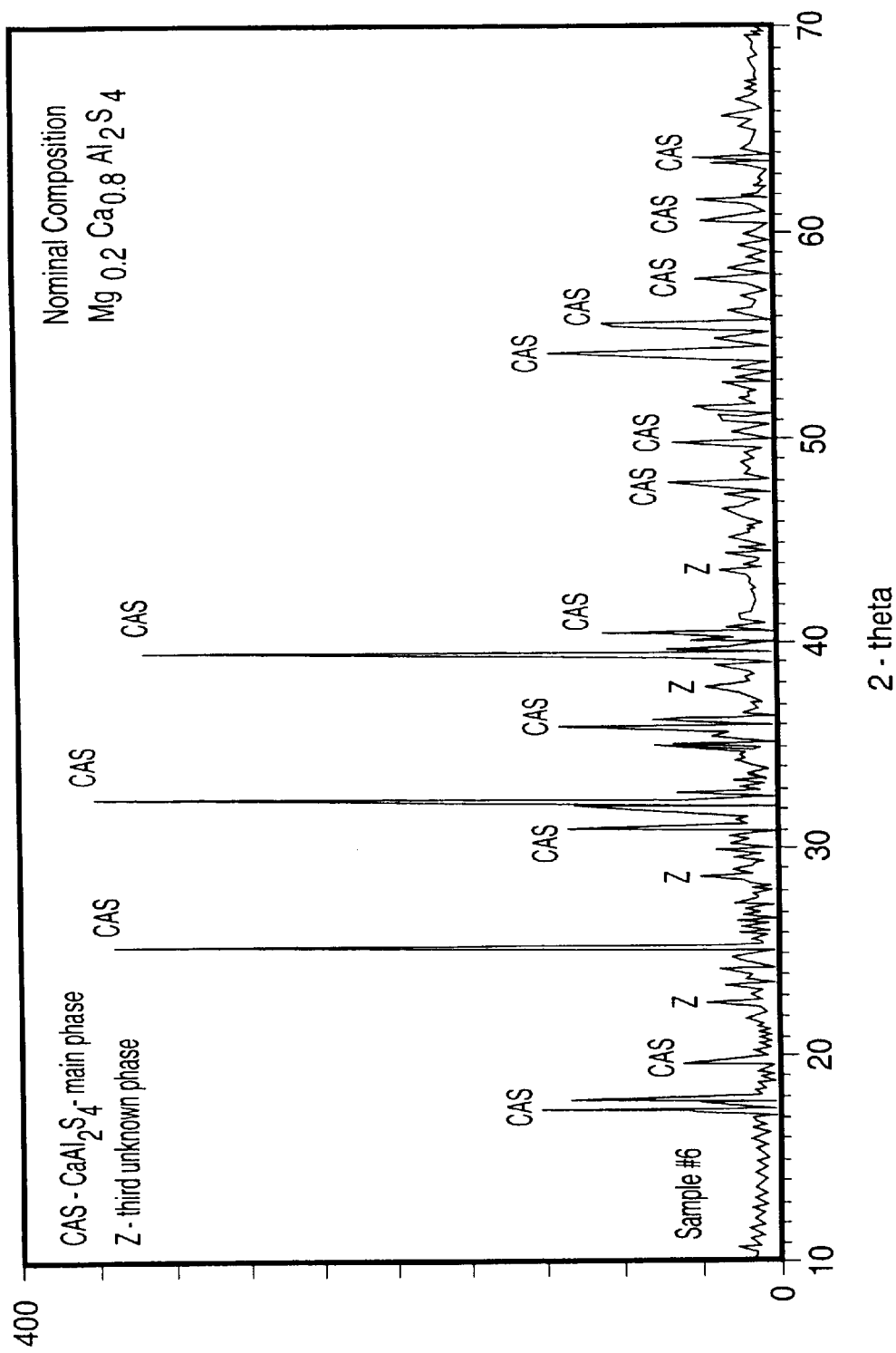
Figure 4G:
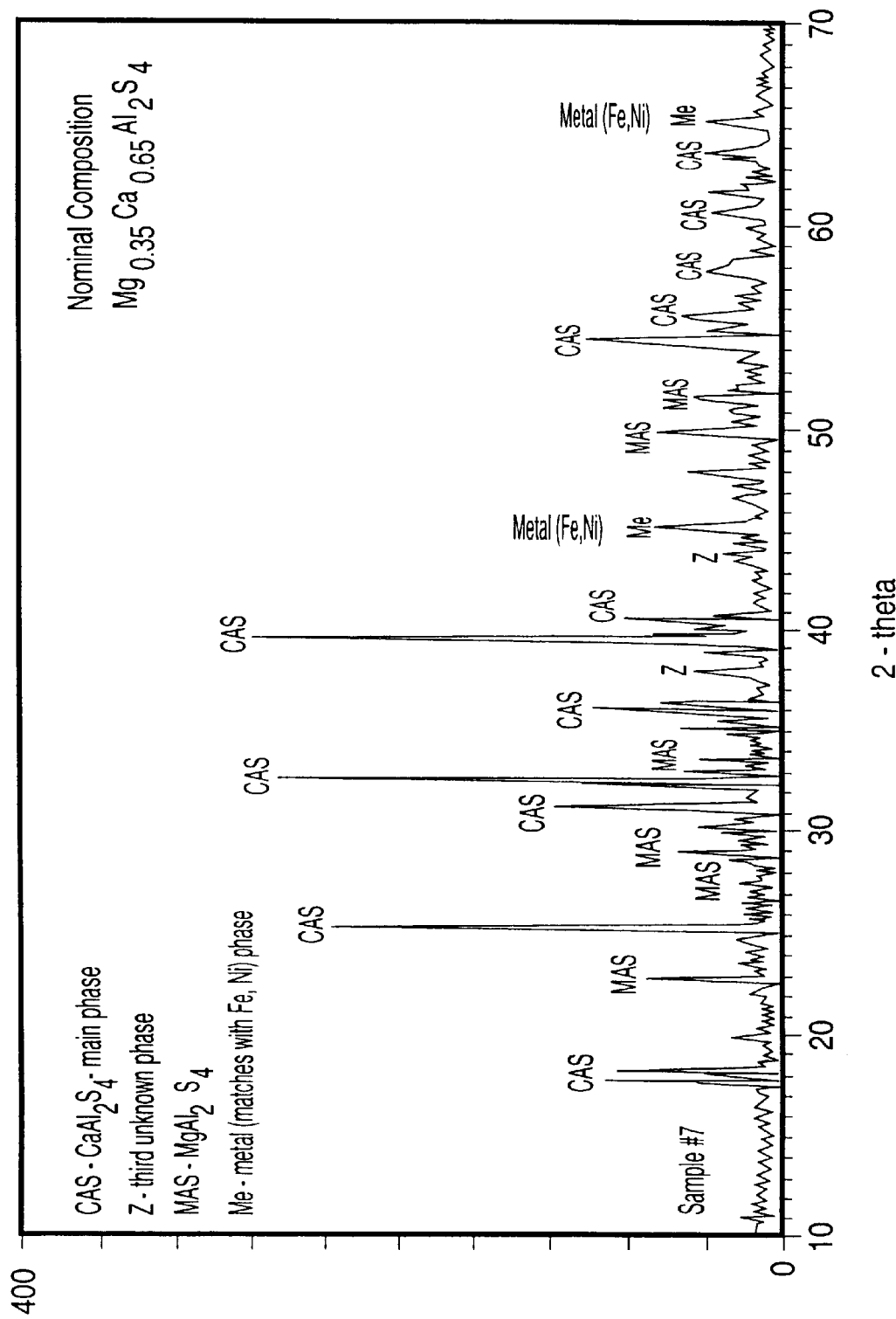
Figure 4H:
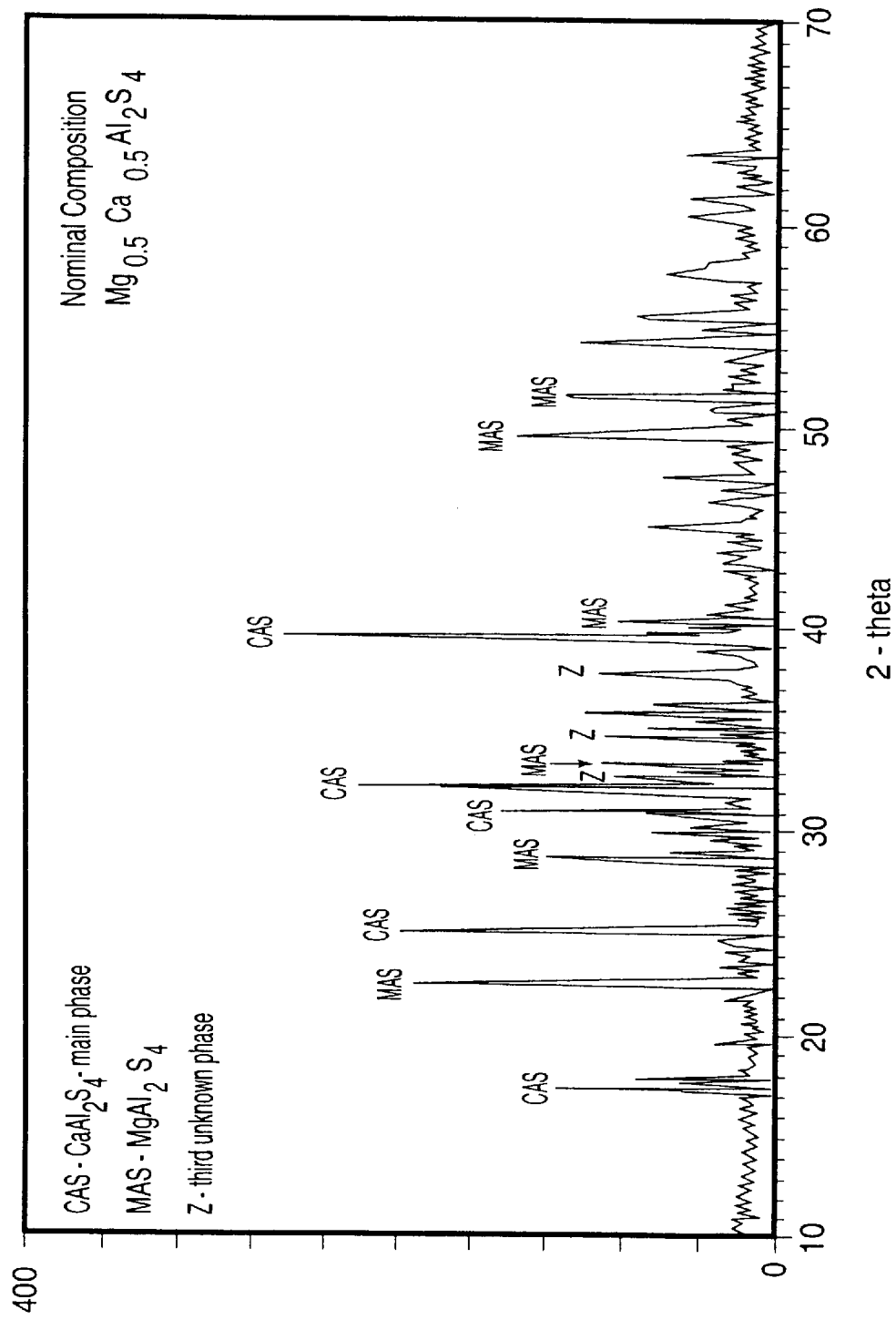

It was found that the compositions with the highest photoluminescence were those with values of x of 0.05 to 0.20 i.e. with a magnesium concentration of 5 to 20 atomic percent. Samples with a magnesium content of 35 atomic percent i.e. x=0.35 showed reduced photoluminescence, with some melting of the pellet being observed. The photoluminescence and the CIE colour coordinates for the photoluminescence of the samples is shown in FIG. 3.

EXAMPLE II

Figure 5:
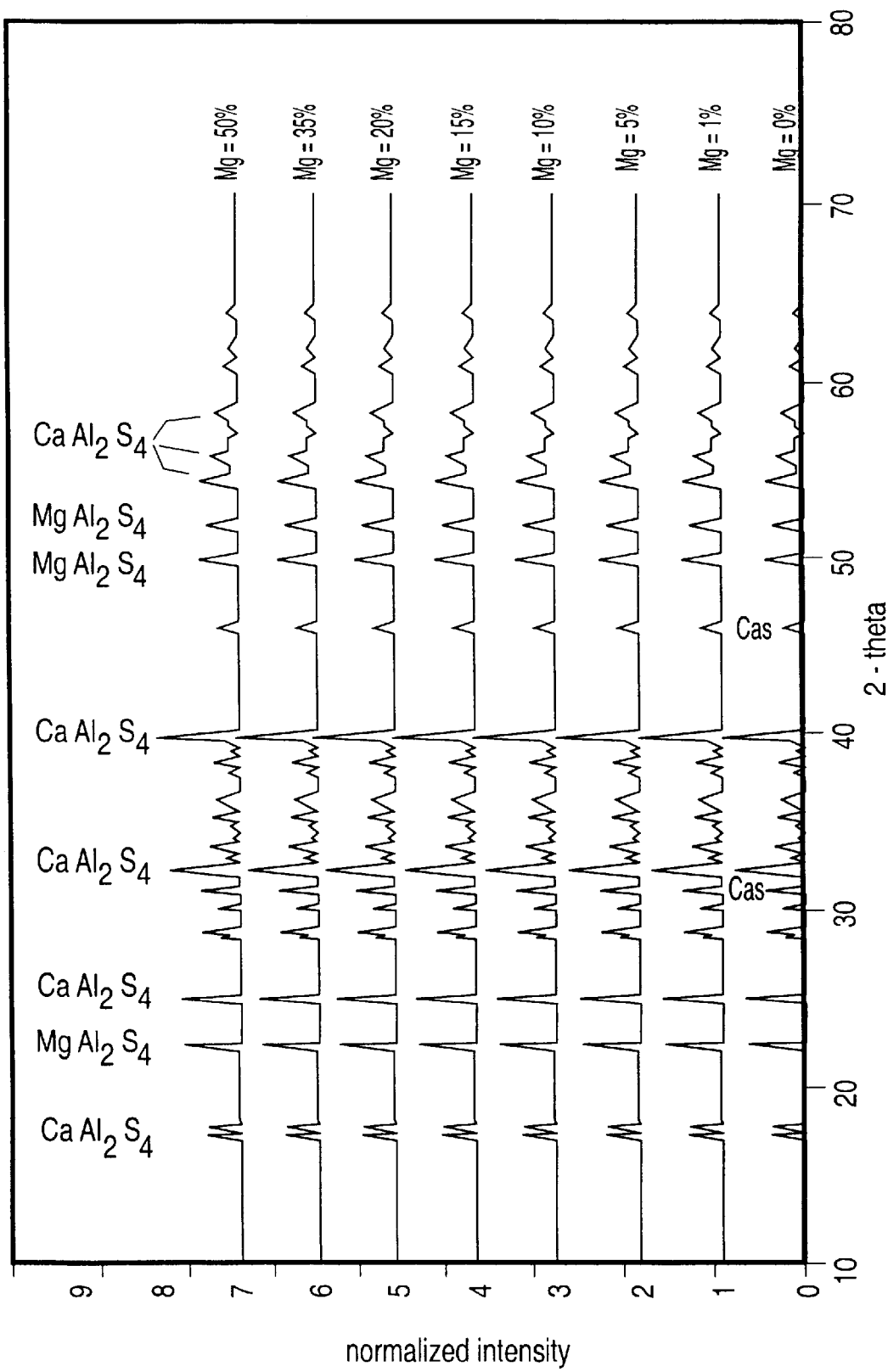
FIG. 5 is a representation of a reduced scale compilation of x-ray patterns for phosphor materials with different magnesium concentrations.

The phosphors prepared as in Example I were subjected to x-ray diffraction analysis. The X-ray diffraction patterns are shown in FIGS. 4a through 4h. In addition, the patterns are shown on a reduced scale with a common x-axis in FIG. 5.

The dominant diffraction pattern for each phosphor is that for calcium thioaluminate.

The diffraction patterns for the phosphors with x=0.00 i.e. no magnesium, and x=0.01 i.e. 1 atomic percent of magnesium, also show diffraction peaks for calcium sulphide, with less calcium sulfide in the latter sample (1 atomic percent magnesium) and a first unidentified crystal phase.

The diffraction pattern for the phosphor with x=0.05 does not show the peak for calcium sulphide, but does show the same unidentified crystal phase (first unidentified crystal phase) as the phosphor with x=0.01.

The diffraction pattern for the phosphor with x=0.10 does not show a peak for calcium sulfide. It does show the same unidentified first crystal phase as in the phosphor with x=0.05, although with a lower intensity, which indicates less of this phase.

The peaks corresponding to the first unidentified crystal phase are absent from the pattern for the phosphor with x=0.15. However, the diffraction pattern for this phosphor shows new unidentified peaks, indicating a second unidentified crystal phase. The x-ray diffraction results for x=0.05, x=0.10 and x=0.15 suggest that a composition with x near 0.10 may exist that consists essentially of a single phase material having the nominal composition as noted. Although the x-ray diffraction patterns are essentially those of calcium thioaluminate some of the calcium is likely displaced by magnesium to produce the nominal chemical composition without causing a measurable change in the crystal structure or lattice constants relative to those of calcium thioaluminate.

For the phosphor with x=0.20, a third unidentified crystal phase is present, but the second unidentified crystal phase is absent. In addition, a phase with a crystal structure similar to that of $MgAl_2S_4$ starts to appear.

The phosphor with x=0.35 shows the third unidentified phase, but none of the second unidentified phase. A significant amount of the phase with the crystal structure of $MgAl_2S_4$ is present, but the major phase is still one with a crystal structure essentially the same as that of $CaAl_2S_4$.

For x=0.50, the x-ray diffraction pattern of the phosphor appears similar to that for x=0.35, except that the abundance ratio of the two phases that are similar to $CaAl_2S_4$ and $MgAl_2S_4$, is approximately unity.

The x-ray diffraction results indicate that a magnesium concentration near 10 atomic percent provides an essentially single phase material with a crystal structure that is very similar to that for calcium thioaluminate. It may comprise a solid solution of magnesium and calcium thioaluminates, although there is no indication of a lattice constant shift that might be expected due to a difference in the size of magnesium and calcium ions in the crystal lattice. There is believed to be no requirement that a lattice constant shift be associated with such a solid solution.

The x-ray diffraction patterns do not give any indication of the formation of amorphous compounds. If such compounds were to form in an appreciable concentration, the pattern would be expected to show a broad peak centered at an angle corresponding to the average interatomic spacing in the hypothesized compound. No such broad peak was observed.

In summary, it appears that an essentially single phase material is formed under the sintering conditions described in Example I when x is near 0.10. The single phase material may perform well as a phosphor material for electroluminescent displays because there are no grain boundaries between dissimilar materials that could strongly scatter electrons injected into the phosphor film, allowing them to accelerate unimpeded to initiate electron multiplication and interact with activator atoms. A single phase material would also preclude corrosion reactions between dissimilar materials that may result in performance degradation of the phosphor material over time.

EXAMPLE III

Several electroluminescent devices were constructed with magnesium calcium thioaluminate phosphor films. The magnesium content in the films corresponded to x=0.00, 0.10, 0.20, 0.35, 0.50, and 0.75 in the formula $Mg_xCa_{1-x}Al_2S_4$:Eu.

The substrate upon which each device was built consisted of alumina sheets measuring 5 centimeter by 5 centimeter, with a thickness of 0.1 centimeters. A gold patterned electrode was deposited on the alumina substrate, followed by a thick film dielectric structure, according to the methods described in U.S. patent application Ser. No. 09/540,288. A thin film dielectric consisting of barium titanate with a thickness of 100 to 200 nanometers was deposited on top of the thick film dielectric. The magnesium calcium thioaluminate phosphor film was deposited on top of the thin film dielectric film by electron beam evaporation using dual evaporation sources as described in U.S. patent application Ser. No. 09/747,315. The source materials comprised, respectively, aluminum sulphide and a mixture of calcium sulphide, magnesium sulphide and europium sulphide. The europium concentration was 3.5 atomic percent of the aluminum concentration. The deposition rate for the film was adjusted to achieve optimum device performance at rates of 6 Angstroms per second for the aluminum sulphide and 3 Angstroms per second for the mixed sulphide source as measured by independent rate monitors. The substrate temperature during deposition was 200° C. The deposited thickness of the phosphor film was 4000 Angstroms.

Following deposition of the phosphor film, a 50 nanometer thick layer of alumina was deposited by evaporation in an atmosphere of about 0.1 millitorr of oxygen gas. The substrate was then annealed under a nitrogen atmosphere at a temperature of 650° C. for 5 minutes. Finally, an indium tin oxide film was deposited to provide a second electrode.

Figure 6:
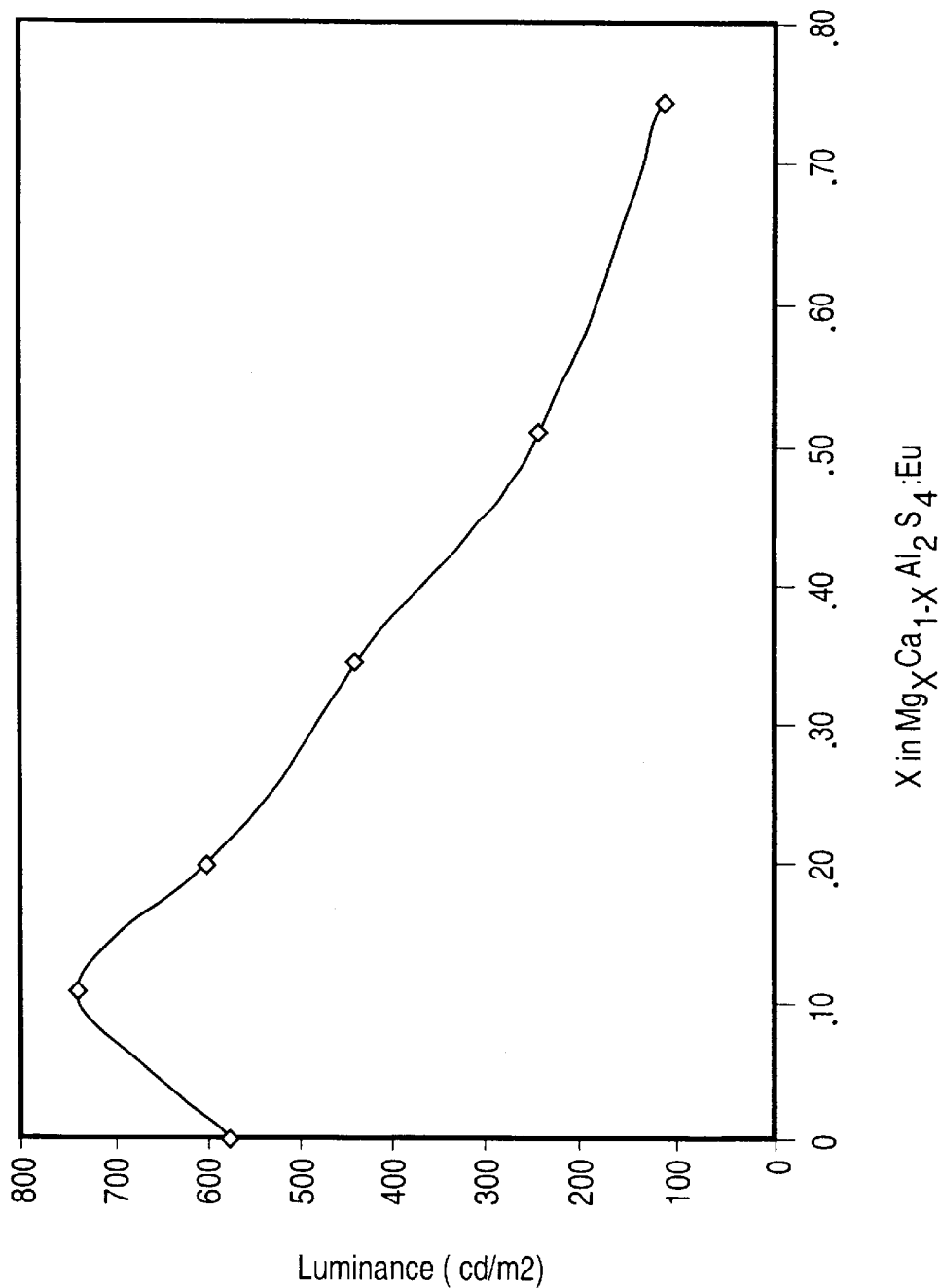
FIG. 6 is a graphical representation of the luminance for electroluminescent devices as a function of magnesium content in the phosphor.

The devices obtained were tested using alternating polarity 32 microsecond wide voltage pulses at a frequency of 240 Hz. The pulse amplitude was varied in increments of 10 volts up to 260 volts. The resulting luminance and CIE colour coordinates of the devices are shown in FIG. 6.

The results show that luminance declines for values of x greater than about 0.20, and declines dramatically for values of x greater than about 0.50. The colour coordinates also shift from green to yellowish green for values of x greater than 0.50.

Figure 7:
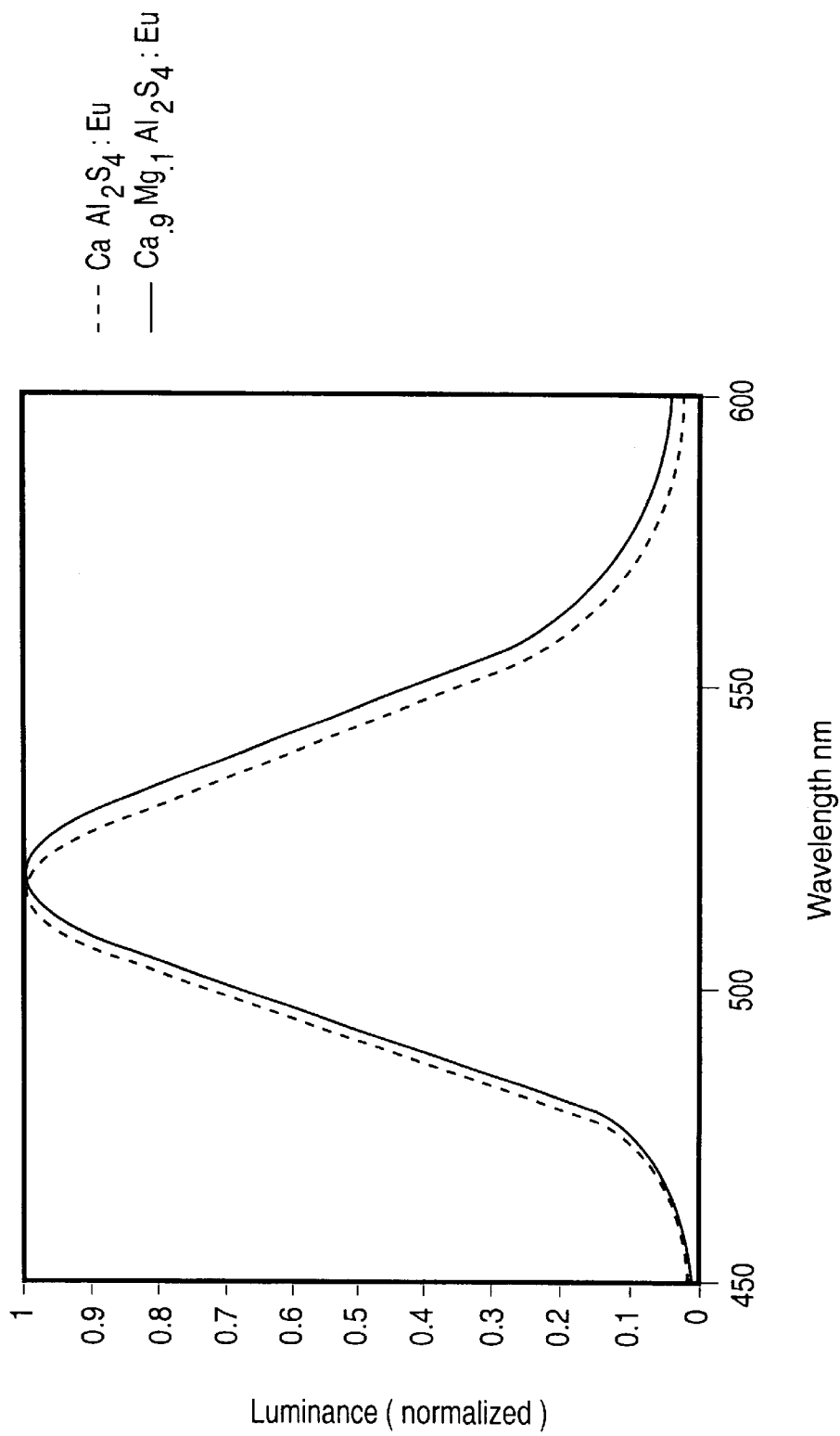
FIG. 7 is a graphical representation of the emission spectra for electroluminescent devices having phosphors with different magnesium concentration.

FIG. 7 shows the luminescence spectrum for devices with x=0 and with x=0.1. As can be seen from the figure, the spectrum for x=0.1 is shifted by about 2 nanometers to longer wavelength. From example II, the composition with x=0.1 is close to a single phase material and the shift in the spectrum relative to that for calcium thioaluminate (x=0) is attributable to the different chemical environment for the europium activator in this material.

EXAMPLE IV

Devices similar to those in Example III were constructed and tested. In all devices, the phosphor was formed from compositions of the formula $Mg_xCa_{1-x}Al_2S_4$:Eu with x=0.10. This composition closely corresponds to the single phase composition identified using x-ray diffraction measurements.

Phosphors were made with europium concentrations corresponding to 1.5 and to 3.5 atomic percent of the aluminum concentration. A control phosphor with no magnesium and 3.5 atomic percent europium was also prepared. In all cases the phosphor film was deposited at 200° C.

Figure 8:
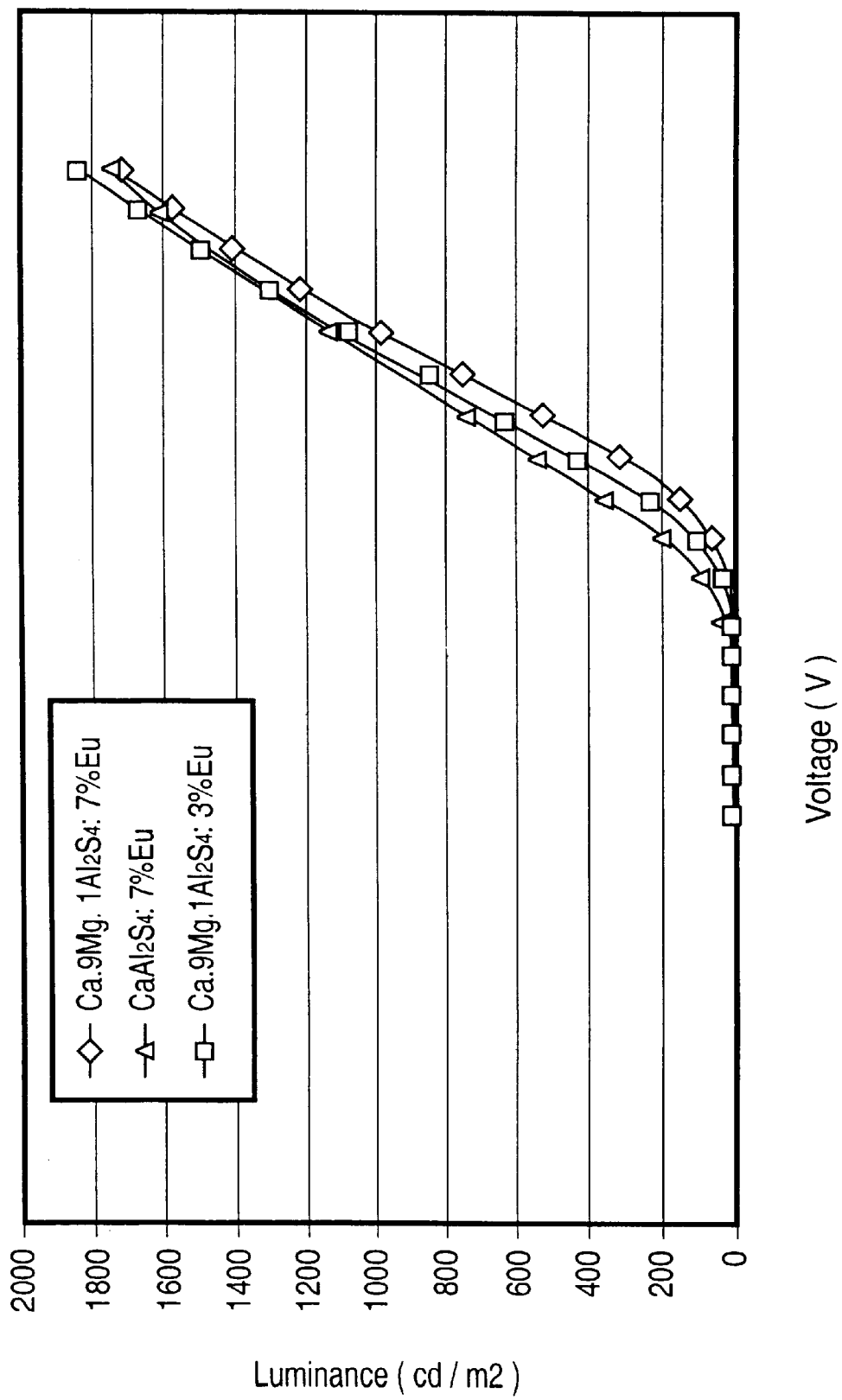
FIG. 8 is a graphical representation of electroluminescence of devices having europium activated magnesium calcium thioaluminate phosphor films with different magnesium and europium concentrations deposited at 200° C.

The test results are shown in FIG. 8. The performance of all of the devices was quite similar, with the phosphor having magnesium and 1.5 atomic percent europium giving the highest luminance and the phosphor without magnesium giving the lowest luminance.

EXAMPLE V

Figure 9:
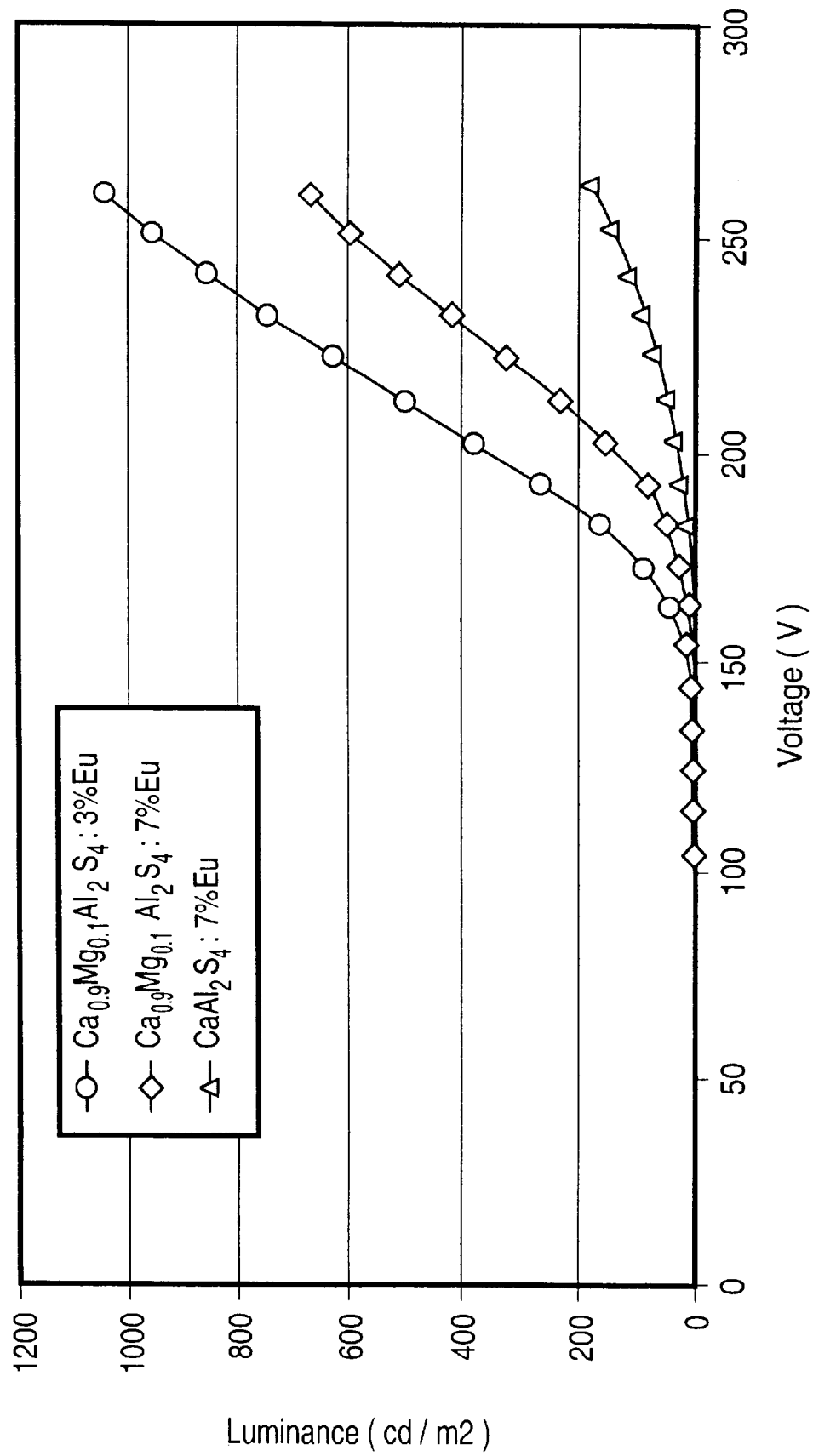
FIG. 9 is a graphical representation of electroluminescence of devices having europium activated magnesium calcium thioaluminate phosphor films with different magnesium and europium concentrations deposited at 175° C.

The procedure of Example IV was repeated except that the phosphor films were deposited with the substrate at a temperature of 175° C., rather than 200° C. The test results are shown in FIG. 9.

For these devices, the highest luminance was obtained for the phosphor with magnesium and 1.5 atomic percent europium and the lowest luminance was obtained for the sample with no magnesium. However, the difference in luminance values was significantly greater than it was for the samples of Example IV, with the sample with no magnesium showing the largest decline in luminance with the reduction in phosphor deposition temperature.

EXAMPLE VI

Figure 10:
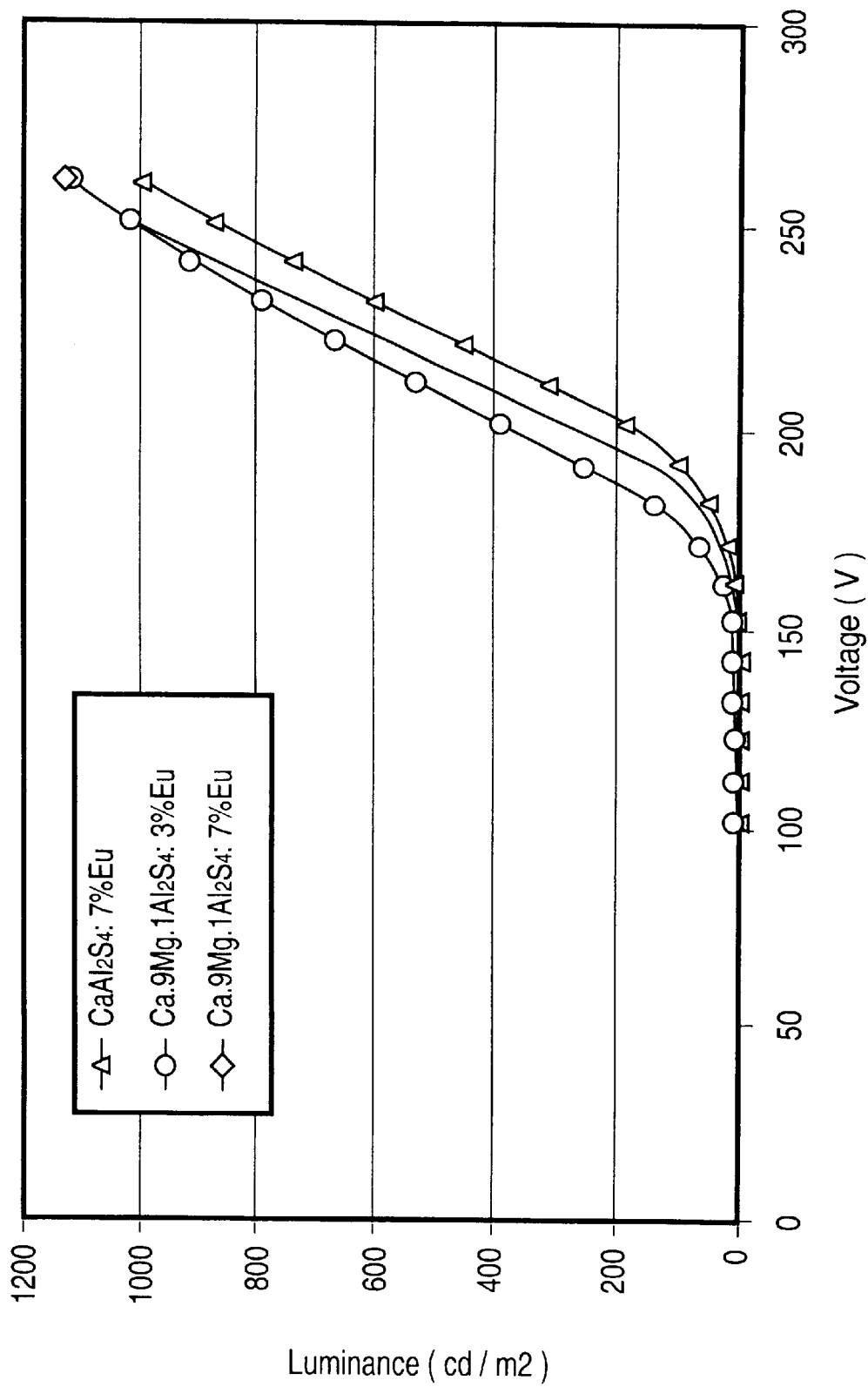
FIG. 10 is a graphical representation of electroluminescence of devices having europium activated magnesium calcium thioaluminate phosphor films with different magnesium and europium concentrations deposited at 150° C.

The procedure of Example IV was repeated except that the substrate temperature during phosphor deposition was further reduced to 150° C. The test results are shown in FIG. 10.

The results show a continuation of the trend towards lower luminance with reduced substrate temperature, but with the reduction for the magnesium-containing phosphors being the smallest.

EXAMPLE VII

Figure 11:
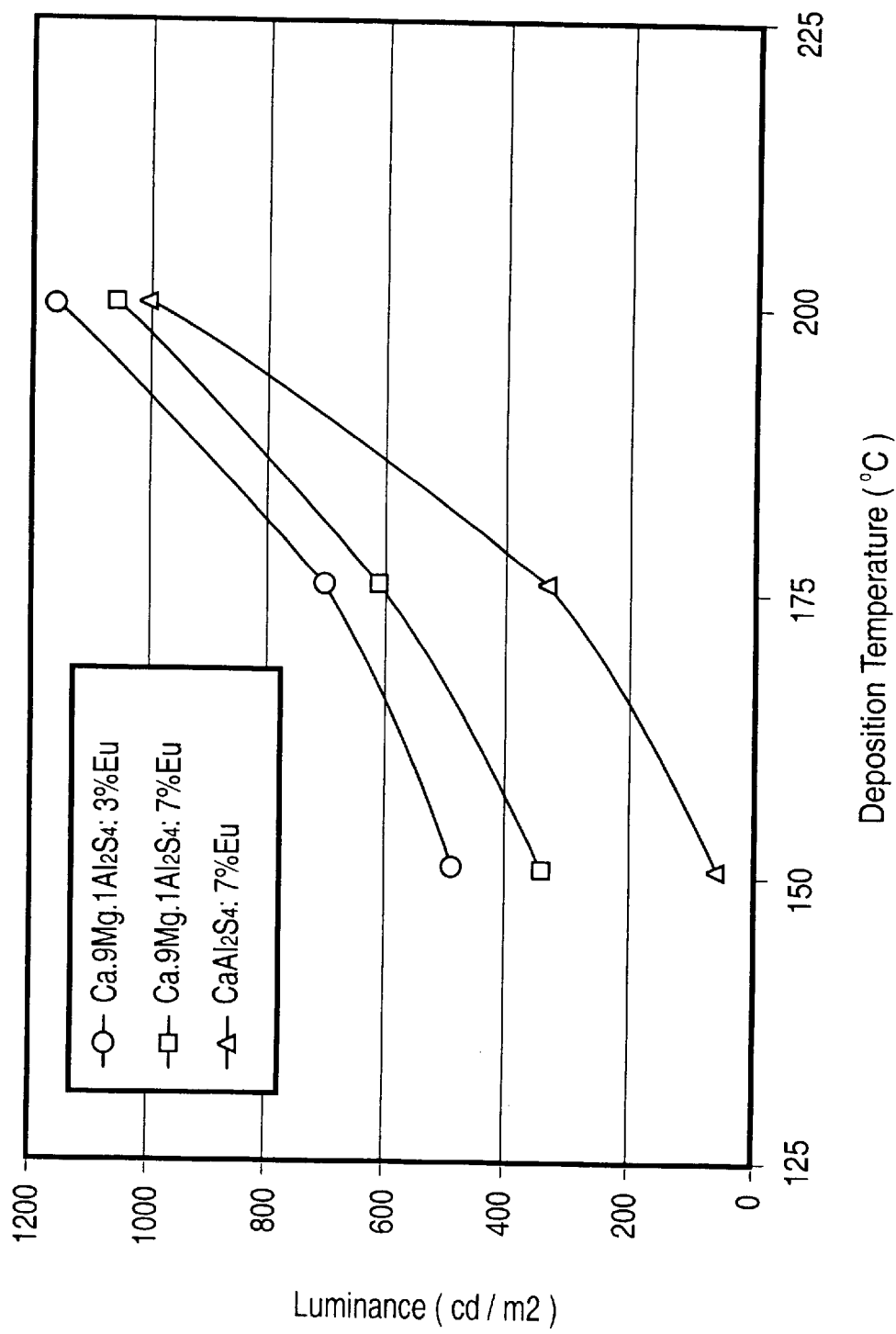
FIG. 11 is a graphical representation of luminance at 60 volts above the threshold voltage of electroluminescent devices with magnesium calcium thioaluminate phosphors with different magnesium and europium concentrations deposited at different temperatures.

The effects of the substrate temperate on the luminance at 60 volts above the threshold voltage for the phosphors of Examples IV, V and VI are shown in FIG. 11. This data clearly shows that the reduction in luminance for lower deposition temperatures is substantially less for the phosphors containing magnesium than for the phosphors without magnesium. Even for a deposition temperature of 150° C., which is a temperature that is sufficiently low to facilitate phosphor patterning using photoresist materials, an acceptable luminance is obtained.

What is claimed is:

1. A thin film phosphor for an electroluminescent device, said phosphor comprising a compound of the formula $Mg_xCa_{1-x}Al_2S_4$:M, where the value of x is in the range $0<x<0.3$ and M is a rare earth activator.

2. The thin film phosphor of claim 1 in which the value of x is in the range $0.05<x<0.20$.

3. The thin film phosphor of claim 2 in which said rare earth activator is europium or cerium.

4. The thin film phosphor of claim 3 in which the atomic ratio of europium to aluminum is in the range of 0.005 to 0.05.

5. An electroluminescent device comprising a thin film phosphor of claim 1 on a substrate.

6. The electroluminescent device of claim 5 in which said rare earth activator is europium or cerium.

7. The electroluminescent device of claim 6 in which said rare earth activator is europium or cerium.

8. The electroluminescent device of claim 6 in which said rare earth activator is europium.

9. The electroluminescent device of claim 6 in which the phosphor has a thickness in the range of 0.2 to 1.0 micrometers.

10. The electroluminescent device of claim 9 in which the phosphor has a thickness in the range of 0.3 to 0.6 micrometers.

11. The electroluminescent device of claim 6 in which the thin film phosphor is adjacent to a thin film of zinc sulphide.

12. The electroluminescent device of claim 11 in which the thin film phosphor is sandwiched between thin films of zinc sulphide.

13. The electroluminescent device of claim 8 in which the atomic ratio of europium to aluminum is in the range of 0.005 to 0.05.

14. A thin film phosphor for an electroluminescent device, said phosphor comprising magnesium calcium thioaluminate activate with a rare earth metal, said magnesium calcium thioaluminate containing an atomic ratio of up to 30 atomic percent of magnesium to magnesium plus calcium to effect a lowering of the temperature of deposition of the phosphor on a substrate.

15. The thin film phosphor of claim 14 in which the rare earth metal is cerium or europium.

16. The thin film phosphor of claim 14 wherein said ratio is about 5 to 20 atomic percent to lower the temperature of deposition to not more than 200° C.

17. The thin film phosphor of claim 16 wherein said magnesium lowers the temperature of deposition to not more than 175° C.

* * * * *